(12) United States Patent
Zhu et al.

(10) Patent No.: US 10,206,150 B2
(45) Date of Patent: Feb. 12, 2019

(54) ELECTRONIC DEVICE IN RADIO COMMUNICATIONS SYSTEM AND RADIO COMMUNICATIONS METHOD

(71) Applicants: Xudong Zhu; Zhaocheng Wang; Jinhui Chen; SONY CORPORATION, Konan, Minato-ku, Tokyo (JP)

(72) Inventors: Xudong Zhu, Beijing (CN); Zhaocheng Wang, Beijing (CN); Jinhui Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/744,148

(22) PCT Filed: May 12, 2016

(86) PCT No.: PCT/CN2016/081850
§ 371 (c)(1),
(2) Date: Jan. 12, 2018

(87) PCT Pub. No.: WO2017/012397
PCT Pub. Date: Jan. 26, 2017

(65) Prior Publication Data
US 2018/0206157 A1 Jul. 19, 2018

(30) Foreign Application Priority Data
Jul. 20, 2015 (CN) .......................... 2015 1 0427405

(51) Int. Cl.
*H04L 27/26* (2006.01)
*H04W 24/10* (2009.01)
(Continued)

(52) U.S. Cl.
CPC ......... *H04W 36/0061* (2013.01); *H04L 5/006* (2013.01); *H04L 5/0032* (2013.01);
(Continued)

(58) Field of Classification Search
CPC . H04W 36/30; H04W 36/0016; H04W 36/14; H04W 36/36; H04W 48/16; H04W 52/0216; H04W 52/50; H04J 11/0093
See application file for complete search history.

(56) References Cited

U.S. PATENT DOCUMENTS

| 8,274,947 B1 | 9/2012 | Fang et al. |
| 9,185,571 B2 | 11/2015 | Niemela |

(Continued)

FOREIGN PATENT DOCUMENTS

| CN | 1913695 A | 2/2007 |
| CN | 103026674 A | 4/2013 |

OTHER PUBLICATIONS

International Search Report dated Jul. 26, 2016 in PCT/CN2016/081850 filed May 12, 2016.

*Primary Examiner* — Nizar N Sivji
(74) *Attorney, Agent, or Firm* — Xsensus LLP

(57) ABSTRACT

The present disclosure relates to an electronic device in a radio communications system and a radio communications method. The radio communications system comprises multiple cells, and the multiple cells comprise a current cell in which an electronic device is located and a neighboring cell. The electronic device comprises: one or more processing circuits. The processing circuits are configured to execute the following operations: obtaining allocation information about reference signals of the current cell and the neighboring cell; determining quality of an available reference signal in the current cell based on the allocation information; and allocating the available reference signal to user equipment based on the quality of the available reference signal. By means of the electronic device and the radio communications method according to the present disclosure, the quality of an available reference signal can be monitored by using interaction information between base stations, thereby (Continued)

implementing optimal configuration of reference signals and improving overall performance of a system.

18 Claims, 10 Drawing Sheets

(51) Int. Cl.
*H04W 36/00* (2009.01)
*H04L 5/00* (2006.01)
*H04W 16/10* (2009.01)
*H04W 72/04* (2009.01)

(52) U.S. Cl.
CPC .......... *H04L 5/0048* (2013.01); *H04L 5/0091* (2013.01); *H04L 27/261* (2013.01); *H04W 24/10* (2013.01); *H04W 36/0044* (2013.01); *H04W 36/0088* (2013.01); H04L 5/0023 (2013.01); H04W 16/10 (2013.01); H04W 72/0426 (2013.01)

(56) References Cited

U.S. PATENT DOCUMENTS

2009/0247164 A1* 10/2009 Kandukuri Narayan ..................... H04W 36/30 455/436
2015/0373721 A1* 12/2015 Zhang .................. H04L 5/0057 370/329

* cited by examiner

ELECTRONIC DEVICE IN RADIO COMMUNICATIONS SYSTEM AND RADIO COMMUNICATIONS METHOD

FIELD

The present disclosure relates to the technical filed of wireless communication, and particularly to an electronic device in a wireless communication system and a wireless communication method for a wireless communication system.

BACKGROUND

Background information related to the present disclosure is provided in this background part, and the background information is not necessarily the conventional technology.

Large-scale multi-input multi-output (MIMO) systems have been widely concerned by academia and industry in recent years. Theoretical studies show that the large-scale MIMO system can significantly improve the spectral efficiency and the energy efficiency of the system by using a simple linear algorithm such as a zero-forcing algorithm and a minimum mean square error algorithm. Therefore, the large-scale MIMO system is likely to be adopted as key technology in a next generation communication standard.

In a scenario of a multi-cell time-division multiplexing, a performance of the large-scale MIMO system is subject to pilot pollution. Since a length of a pilot is limited by a coherent length of a channel, the number of pilots orthogonal to each other is limited and there is an inevitable case of pilot reutilization or pilot coherence among different cells. In this case, pilot signals transmitted by a user adopting a sequence of a same pilot or a sequence of incompletely orthogonal pilots in different cells are received by a base station, however, the base station cannot effectively distinguish these pilot signals from each other, thus resulting in an interference on the channel estimation at the base station. In the case where the base station detects uplink data using estimation of the interfered channel, the base station receives not only data transmitted by a user of a current cell, but also data transmitted by a user of another cell, thus resulting in an inter-cell interference in an uplink. On the other hand, in the case where the base station generates a pre-coding matrix using the estimation of the interfered channel and transmits downlink data, the user in the another cell can also receive the data in addition to the user in the current cell, thus resulting in an inter-cell interference in a downlink.

Theoretical studies show that although the spectral efficiency and the energy efficiency of the large-scale MIMO system can be significantly improved, and with the increase of the number of antennas of a base station, an effect on the system performance caused by an error of the channel estimation and noises is decreased. However, the inter-cell interference caused by the pilot pollution cannot be eliminated, and becomes one of factors constraining performances of the large-scale MIMO system.

The existing method for alleviating pilot pollution generally has following problems: (1) the algorithm is based on an ideal condition which can be met only in the case where the number of antennas of the base station is infinity; (2) a lot of priori information and multi-cell cooperation are required, so as to acquire a part of the performance gain with huge overhead in other aspects; (3) the algorithm is extremely complex, and is generally difficult to be implemented in the actual system. Therefore, the existing method for alleviating the pilot pollution is generally difficult to meet a current technical condition, so the pilot pollution is still one of serious problems to which the large-scale MIMO system faces in a practical application.

Therefore, it is necessary to provide a new wireless communication technical solution to optimize a configuration of a pilot, thereby reducing an inter-cell interference and improve an overall performance of a system.

SUMMARY

A general overview rather than all scopes or all features of the present disclosure is provided in this summary part.

An objective of the present disclosure is to provide an electronic device in a wireless communication system and a wireless communication method in a wireless communication system, such that a quality of an available pilot can be monitored by exchanging information between base stations, thereby achieving an optimal configuration of the pilot and improving an overall performance of the system.

An electronic device in a wireless communication system is provided according to an aspect of the present disclosure. The wireless communication system includes multiple cells including a current cell in which the electronic device is located and a neighbor cell, and the electronic device includes one or more processing circuits configured to perform operations of: acquiring allocation information on reference signals of the current cell and the neighbor cell; determining, based on the allocation information, qualities of available reference signals of the current cell; and allocating, based on the qualities of the available reference signals, an available reference signal to a user equipment.

Preferably, the processing circuit may be further configured to perform operations of: selecting multiple available reference signals with a high quality as candidate reference signals; performing a coherent operation on a received used reference signal with each of the candidate reference signals, to estimate an intensity of an interference to which each of the candidate reference signals is subject from the neighbor cell; and allocating a candidate reference signal with a minimum interference intensity, as an available reference signal with a highest quality, to the user equipment.

Preferably, each of the multiple cells may include multiple cell partitions, and the processing circuit may be further configured to perform operations of: acquiring allocation information on reference signals of cell partitions of each of the current cell and the neighbor cell; and determining, based on the allocation information, the qualities of available reference signals of a current cell partition in which the user equipment is located.

Preferably, the processing circuit may be further configured to perform operations of: selecting multiple available reference signals with a high quality of the current cell partition as candidate reference signals; performing a coherent operation on a received used reference signal with each of the candidate reference signals, to estimate an intensity of an interference to which each of the candidate reference signals is subject from the neighbor cell or other cell partitions of the current cell; and allocating a candidate reference signal with a minimum interference intensity, as an available reference signal with a highest quality, to the user equipment.

A user equipment in a wireless communication system is provided according to another aspect of the present disclosure. The wireless communication system includes multiple cells including a current cell in which the user equipment is located and a neighbor cell, and the user equipment includes: a transceiver; and one or more processing circuits configured to cause the transceiver to perform operations of: receiving a used downlink reference signal from the neighbor cell; informing a base station of the current cell of information on the received used downlink reference signal; and receiving, from the base station of the current cell, an available downlink reference signal with a highest quality.

A wireless communication method in a wireless communication system is provided according to another aspect of the present disclosure. The wireless communication system includes multiple cells including a current cell and a neighbor cell, and the method includes: acquiring allocation information on reference signals of the current cell and the neighbor cell; determining qualities of available reference signals of the current cell based on the allocation information; and allocating an available reference signal to a user equipment based on the qualities of the available reference signals.

A wireless communication method in a wireless communication system is provided according to another aspect of the present disclosure. The wireless communication system includes multiple cells including a current cell and a neighbor cell, and the method includes: receiving a used downlink reference signal from the neighbor cell; informing a base station of the current cell of information on the received used downlink reference signal; and receiving, from the base station of the current cell, an available downlink reference signal with a highest quality.

With the electronic devices in the wireless communication system and the wireless communication methods in the wireless communication system according to the present disclosure, information on a reference signal such as the pilot can be shared by exchanging information between base stations and a quality of an available reference signal is estimated, so as to allocate an optimal reference signal to a user newly accessed. In this way, through optimizing a configuration of the reference signal, more user equipment can be supported, the inter-cell interference is reduced, and the overall performance of the system is improved without changing a structure of an existing communication device by increasing a length of the reference signal sequence.

A further applicable scope becomes more apparent from the description provided here. The description and the specific examples in the overview are only illustrative, and are not intended to limit the scope of the present disclosure.

BRIEF DESCRIPTION OF THE DRAWINGS

The drawings are only used for illustrating the selected embodiments rather than all possible implementations, and are not intended to limit the scope of the present disclosure. In the drawings:

FIG. 8($b$) is a graph showing comparison of uplink average signal to interference plus noise ratios (SINRs) of a user with different pilot allocation schemes in a simple scenario;

FIG. 9($b$) is a graph showing comparison of uplink average SINRs of a user with different pilot allocation schemes in the case where an SRS sequence is used in the 3GPP;

Figure 1:
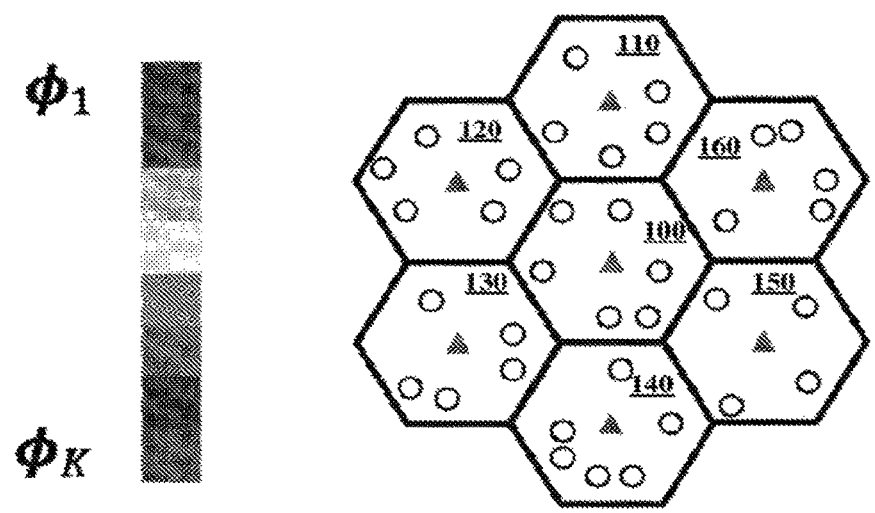
FIG. 1 is a schematic diagram showing a scenario of a multi-cell multi-user mobile cellular network.

Although various modification and alternations are easily made onto the present disclosure, the specific embodiments are shown in the drawings as an example, and are described in detail here. It should be understood that description for the specific embodiments is not intended to limit the present disclosure into a disclosed specific form, and the present disclosure aims to cover all modification, equivalents and alternations within the spirit and scope of the present disclosure. It should be noted that, a numeral denotes a component corresponding to the numeral through the drawings.

DETAILED DESCRIPTION OF EMBODIMENTS

The example of the present disclosure is described more fully with reference to the drawings, and the following description is only exemplary and is not intended to limit the present disclosure, an application or use.

Exemplary embodiments are provided to make the present disclosure thorough, and to convey the scope of the present disclosure to those skilled in the art. Examples of many specific details such as specific components, devices and methods are described to provide thorough understanding for the embodiments of the present disclosure. It is apparent for those skilled in the art that the exemplary embodiments may be embodied in multiple different manners without using specific details, and the exemplary embodiments should not be interpreted to limit the scope of the present disclosure. Well-known processes, structures and technology are not described in detail in some exemplary embodiments.

A user equipment (UE) related in the present disclosure includes but is not limited to a terminal having a wireless communication function such as a mobile terminal, a computer, and an on-board device. Furthermore, the UE related in the present disclosure may also be a key component for example a chip in a final product. In addition, a base station related in the present disclosure may be for example an evolution node base station (eNB) or a component such as a chip in the eNB.

FIG. 1 shows a scenario of a multi-cell multi-user mobile cellular network to which the technical solution of the present disclosure may be applied. As shown in FIG. 1, different pilots Φ1 to Φk are represented by different grayscales. There are multiple cells 100 to 160 in the wireless communication system shown in FIG. 1, where the cell 100 is defined as a current cell, and the cells 110, 120, 130, 140, 150 and 160 are defined as neighbor cells. In each cell, a triangular symbol represents a base station and a circle represents a UE.

As mentioned above in the background part, since the number of the pilots Φ1 to Φk is limited, there is an inevitable case of pilot frequency reutilization among different cells. In this case, pilot signals transmitted by a UE adopting a sequence of a same pilot or a sequence of incomplete orthogonal pilots in different cells are received by a base station, however, the base station cannot effectively distinguish these pilot signals from each other, thereby resulting in an interference on the channel estimation at the base station, and thus resulting in an inter-cell interference in an uplink and a downlink.

Figure 2:
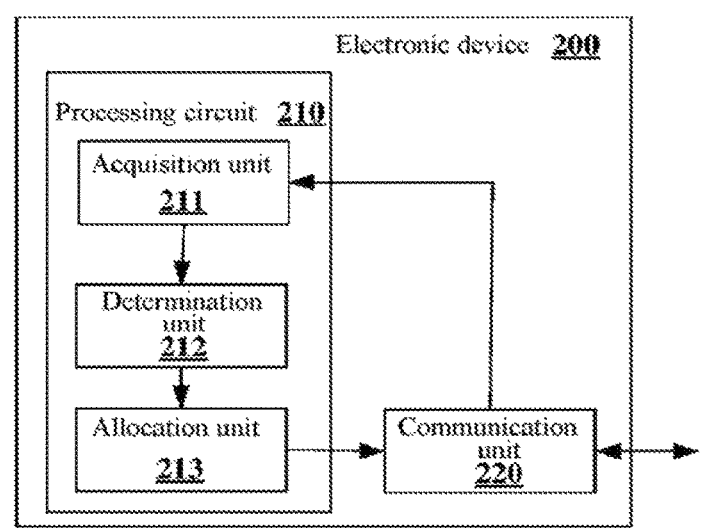
FIG. 2 is a block diagram showing a structure of an electronic device in a wireless communication system according to an embodiment of the present disclosure.

In order to solve at least one of the above-mentioned issues, a technical solution according to the present disclosure is proposed. FIG. 2 shows a structure of an electronic device 200 in a wireless communication system according to an embodiment of the present disclosure.

As shown in FIG. 2, an electronic device 200 may include a processing circuit 210. It should be illustrated that the electronic device 200 may include one processing circuit 210 or multiple processing circuits 210. In addition, the electronic device 200 may further include a communication unit 220 and the like.

Further, the processing circuit 210 may include various discrete functional units to perform various different functions and/or operations. It should be noted that the functional units may be a physical entity or a logical entity, and units having different names may be implemented by a same physical entity.

For example, as shown in FIG. 2, the processing circuit 210 may include an acquisition unit 211, a determination unit 212, and an allocation unit 213.

The acquisition unit 211 may acquire allocation information on reference signals of a current cell and a neighbor cell.

The determination unit 212 may determine, based on the allocation information acquired by the acquisition unit 211, qualities of available reference signals of the current cell.

The allocation unit 213 may allocate, based on the qualities of the available reference signals determined by the determination unit 212, an available reference signal to a UE.

With the electronic device 200 according to the embodiment of the present disclosure, the available reference signal may be allocated to the UE based on the qualities of the available reference signals in the current cell. In this way, an available reference signal with a highest quality can be allocated to the UE, to optimize a configuration of the reference signal (a pilot frequency), thereby reducing an inter-cell interference, and improving an overall performance of the system.

Figure 3:
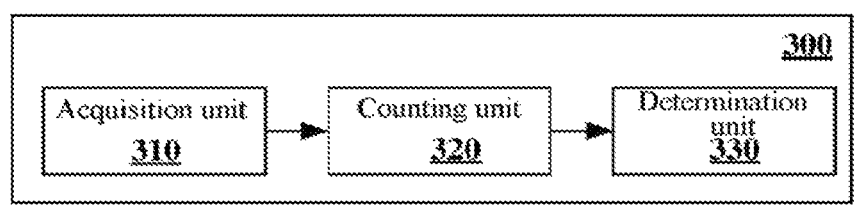
FIG. 3 is a block diagram showing a structure of a determination unit in an electronic device in a wireless communication system according to an embodiment of the present disclosure.

FIG. 3 shows a structure of a determination unit 300 in an electronic device in a wireless communication system according to an embodiment of the present disclosure. The determination unit 300 shown in FIG. 3 may correspond to, for example, the determination unit 212 (and the acquisition unit 211) shown in FIG. 2.

As shown in FIG. 3, the determination unit 300 may include an acquisition unit 310, a counting unit 320, and a determination unit 330.

First, the acquisition unit 310 may acquire information on used reference signals of a neighbor cell. It should be noted that, in some examples, cells that interfere with each other for wireless transmission and are not geographically adjacent to each other may function as the neighbor cells to exchange information on the used reference signals.

Next, the counting unit 320 may count the number of used reference signals highly coherent with the available reference signals of the current cell. It should be noted that different reference signal sequences generated by a cyclic shift may be regarded as different reference signals, and reference signals allocated to different time-frequency resources may also be regarded as different reference signals.

After that, the determination unit 330 may determine the qualities of the available reference signals based on a result of the counting.

According to a preferred embodiment of the present disclosure, the counting unit 320 may, for example, count the number of used reference signals identical to the available reference signal of the current cell.

Further, the electronic device in the wireless communication system according to an embodiment of the present disclosure (such as the processing circuit 210 shown in FIG. 2) may rank the available reference signals based on the qualities of the available reference signals. In the example of the present disclosure, with the decrease of the number of times for which a reference signal itself or a reference signal highly coherent with the reference signal is used by other cells, an interference to which the reference signal is subject decreases, a quality of the reference signal is improved, and vice versa. Hereinafter, the determination on a degree of coherence is described by specific examples.

Figure 4:
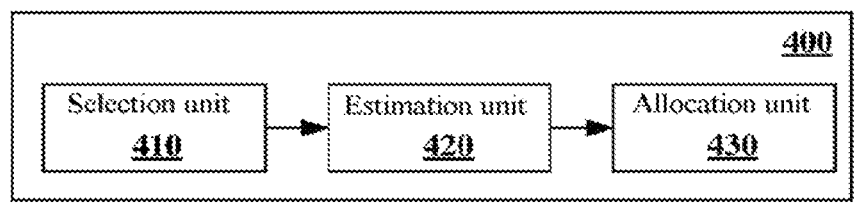
FIG. 4 is a block diagram showing a structure of an allocation unit in an electronic device in a wireless communication system according to an embodiment of the present disclosure.

FIG. 4 shows a structure of an allocation unit 400 in an electronic device in a wireless communication system according to an embodiment of the present disclosure. The allocation unit 400 shown in FIG. 4 may correspond to, for example, the allocation unit 213 shown in FIG. 2.

As shown in FIG. 4, the allocation unit 400 may include a selection unit 410, an estimation unit 420 and an allocation unit 430.

First, the selection unit 410 may select multiple available reference signals with a high quality as candidate reference signals. Preferably, available reference signals may be ranked in an ascending order of the numbers of times that the available reference signals are reused, and first n signals among the available reference signals with the least numbers of times are selected as candidate reference signals. The number of selected available reference signals with a relatively high quality can be determined based on compromise between a requirement of accuracy of a used communication system on channel estimation, computing resources of a corresponding electronic device, a delay requirement, and the like. It is appreciated that, with the increase of the number of the selected candidate reference signals, a reference signal subjecting to a smallest estimated interference is more likely to approximate to the actual situation.

Next, the estimation unit 420 may perform a coherent operation on the received used reference signal with each of the candidate reference signals, to estimate an intensity of an interference to which each of the candidate reference signals is subject from the neighbor cell.

After that, the allocation unit 430 may allocate a candidate reference signal with a minimum interference intensity to the user equipment as an available reference signal with a highest quality. In an example of the LTE communication system, user equipment in a same cell use a same reference signal sequence, and an LTE base station, that is, an eNB, to which the solution of the present disclosure is applied, applies a sequence of candidate reference signals with a minimum interference intensity to a user equipment in a cell which the LTE base station serves. For example, instruction information on the reference signal sequence is included in cell system information for broadcasting. Further, the eNB may provide different cyclic shifts (that is, phase rotations) or transmission combs for different user equipment to process reference signals, such that reference signals used by the user equipment in a same cell are orthogonal. For example, the eNB indicates a reference signal sequence in the system information and further informs the respective user equipment of configuration parameters of a corresponding cyclic shift/transmission comb through high-layer RRC signaling, to complete allocation of the available reference signals. In addition, the eNB may also coordinate with a neighbor cell configuration parameters of a transmission comb, a cyclic shift, a configuration of transmission subframes, and the like. According to an embodiment of the present disclosure, identical reference signals may be defined as reference signals occupying the same time-frequency resource and having the same sequence, and orthogonal reference signals may be defined as reference signals occupying orthogonal time-frequency resources or having orthogonal sequences, and other reference signals except the identical reference signals and the orthogonal reference signals are coherent reference signals. The identical reference signals are a specific example of the coherent reference signals.

Further, the processing circuit (for example, the acquisition unit 211 shown in FIG. 2) in the electronic device in the wireless communication system according to the embodiment of the present disclosure may periodically and/or dynamically acquire updated allocation information on reference signals of the current cell and the neighbor cell. Further, the processing circuit (the determination unit 212 as shown in FIG. 2) may update qualities of the available reference signals of the current cell based on the updated allocation information.

Figure 5:
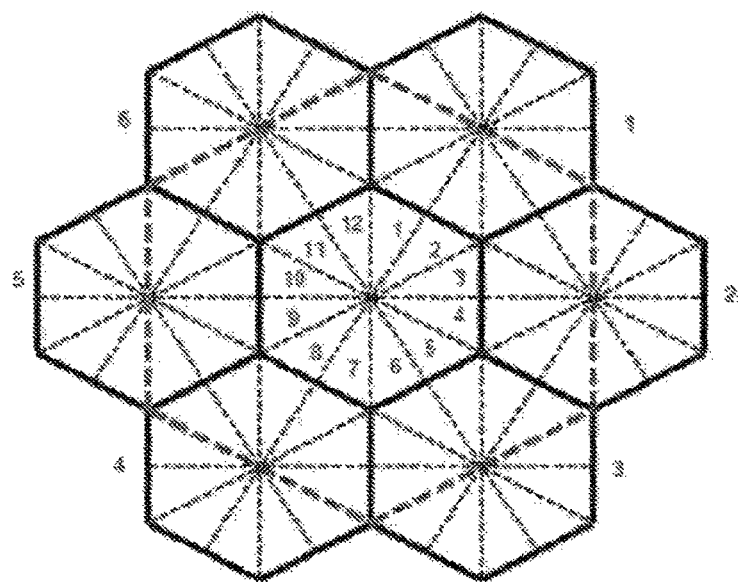
FIG. 5 is a schematic diagram showing another scenario of the multi-cell multi-user mobile cellular network.

In addition, according to an embodiment of the present disclosure, each of the multiple cells may include multiple cell partitions, as shown in FIG. 5. FIG. 5 shows another scenario of the multi-cell multi-user mobile cellular network.

In FIG. 5, each cell is divided into multiple regions (for example, sectors as shown in FIG. 5), and the base station allocates reference signals to each sector of a cell which the base station serves, so that same reference signals or coherent reference signals can be shared among different sectors in the cell. For example, sharing is achieved between a sector 1 and a sector 7 far away from each other.

Specifically, for example, in the case where a reference signal is to be allocated to a new user equipment in the sector 7 of a cell 0 (a cell in the middle of the figure), reference signals received by a base station of the cell 0 may include a reference signal transmitted from a user equipment in a neighbor cell, or include a reference signal transmitted from a user equipment in the cell such as in the sector 1.

In addition, in the example shown in FIG. 5, it is also considered that using of only reference signals of the sectors in the neighbor cell within dashed lines in the figure will cause an interference to the current cell. Thus, information on reference signals recorded by the base station indicates that, for example, the reference signals are used in sectors of a neighbor cell within a corresponding dashed line, and the base station calculates the number of times that the reference signals are reused by the neighbor cell within the dashed line to select candidate reference signals. Correspondingly, information on reference signals exchanged among various cells may be at a sector-level. For example, each cell records utilization of reference signals in its sectors and interact with a neighbor cell, thus reference signals can be allocated more finely.

In the case where each of the multiple cells described above includes multiple cell partitions, according to a preferred embodiment of the present disclosure, for example, the acquisition unit 211 as shown in FIG. 2 may acquire allocation information on reference signals of cell partitions of each of the current cell and the neighbor cell. Further, the determination unit 212 may determine qualities of available reference signals of a current cell partition in which the user equipment is located based on the allocation information.

Preferably, for example, the acquisition unit 310 as shown in FIG. 3 may acquire information on used reference signals of cell partitions of a neighbor cell. Further, the counting unit 320 may count the number of used reference signals highly coherent with the available reference signals of the current cell partition. Next, the determination unit 330 may determine the qualities of the available reference signals based on a result of the counting.

According to a preferred embodiment of the present disclosure, the counting unit 320 may count the number of used reference signals identical to the available reference signals of the current cell partition.

Preferably, for example, the selection unit 410 as shown in FIG. 4 may select multiple available reference signals with a high quality of the current cell partition as candidate reference signals. Next, the estimation unit 420 may perform a coherent operation on the received used reference signal with each of the candidate reference signals to estimate an intensity of an interference to which each of the candidate reference signals is subject from the neighbor cell or other cell partitions of the current cell. After that, the allocation unit 430 may allocate a candidate reference signal with a minimum interference intensity to the user equipment as an available reference signal with a highest quality. According to this example, two user equipment in a same LTE cell may transmit a same reference signal sequence with a same cyclic shift/transmission comb.

Further, the processing circuit (for example, the acquisition unit 211 as shown in FIG. 2) in the electronic device in the wireless communication system according to the embodiment of the present disclosure may periodically and/or dynamically acquire updated allocation information on the reference signals of the cell partitions of each of the current cell and the neighbor cell. Further, the processing circuit (the determination unit 212 as shown in FIG. 2) may update the qualities of the available reference signals of the current cell partition based on the updated allocation information.

According to an embodiment of the present disclosure, the above-mentioned reference signal may be an uplink reference signal, such as a sounding reference signal (SRS) or a demodulation reference signal (DMRS) in an LTE system.

According to an embodiment of the present disclosure, the above-mentioned reference signal may also be a downlink reference signal which is, for example, at least one of a cell-specific reference signal (CRS), a channel state information reference signal (CSI-RS), and a downlink demodulation reference signal in an LTE system.

Preferably, the processing circuit (for example, the selection unit 410 as shown in FIG. 4) may select multiple available downlink reference signals with a high quality as candidate downlink reference signals to inform the user equipment. Further, the processing circuit may further acquire a report on a used downlink reference signal received by the user equipment from the neighbor cell. Further, the processing circuit (for example, the estimation unit 420 as shown in FIG. 4) may perform a coherent operation on the used downlink reference signal received by the user equipment with each of the candidate downlink reference signals, to estimate an intensity of an interference to which the each of the candidate downlink reference signals is subject from the neighbor cell. After that, the processing circuit (for example, the allocation unit 430 as shown in FIG. 4) may allocate a candidate downlink reference signal with a minimum interference intensity to the user equipment as an available downlink reference signal with a highest quality.

On the other hand, the processing circuit does not necessarily have a function of the estimation unit, for example, the function may be achieved on a side of a corresponding user equipment. In particular, a processing circuit (for example, the selection unit in the processing circuit) may select multiple available downlink reference signals with a high quality as candidate downlink reference signals to inform the user equipment. Next, in response to information from the user equipment on an estimated intensity of an interference to which each of the candidate downlink reference signals is subject from the neighbor cell, the processing circuit (for example, the allocation unit in the processing circuit) may allocate a candidate downlink reference signal with a minimum estimated interference intensity to the user equipment as an available downlink reference signal with a highest quality.

Furthermore, the processing circuit may further determine a report threshold and select multiple available downlink reference signals with a high quality as candidate downlink reference signals to inform the user equipment. After that, in response to information from the user equipment on a candidate downlink reference signal with a desired interference intensity from the neighbor cell which is smaller than the report threshold among the candidate downlink reference signals and a desired interference level, the processing circuit may allocate a candidate downlink reference signal with a minimum interference intensity to the user equipment as an available downlink reference signal with a highest quality.

It should be noted that, according to an embodiment of the present disclosure, the wireless communication system as described above may be a long term evolution-advanced (LTE-A) cellular communication system, the electronic device 200 may be a base station, and the electronic device 200 may further include a communication unit 220, such as a transceiver. The communication unit 220 may acquire, for example, allocation information on reference signals of a neighbor cell via X2 signaling.

It is to be understood that the present disclosure is aimed at reducing an adverse effect of pilot pollution on the communication system, and the present disclosure is not limited to the above-described LTE system and is applicable to the existing or future communication systems which require to estimate a channel by a pilot, for example, the time division synchronous code division multiple access (TD-SCDMA), the wideband code division multiple access (WCDMA), the worldwide interoperability for microwave access (WiMAX), which are not listed in detail here. It is to be noted that in an example in which the electronic device is implemented as a base station with mobility (for example, supporting a moving cell) or a small base station supporting a dynamic switching function, due to the uncertainty of the location and the surrounding radio environment of the electronic device, the pilot can be selected dynamically, operability is better and a better transmission performance can be achieved with the solution according to the present disclosure, as compared with a conventional manner of setting a pilot frequency.

Figure 6:
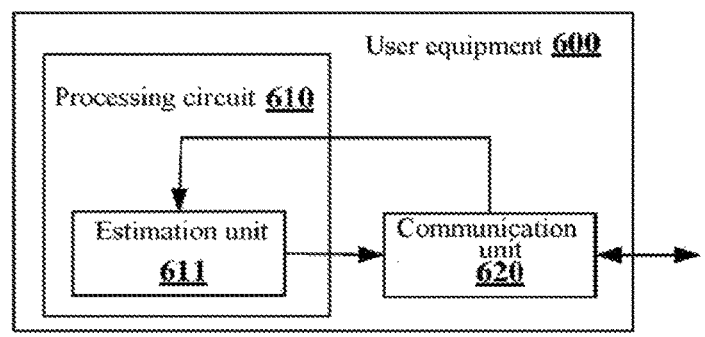
FIG. 6 is a block diagram showing a structure of a user equipment in a wireless communication system according to an embodiment of the present disclosure.

Next, a user equipment in a wireless communication system is described in detail. FIG. 6 shows a structure of a user equipment 600 in a wireless communication system according to an embodiment of the present disclosure. Similarly, the wireless communication system includes multiple cells including a current cell in which the user equipment 600 is located and a neighbor cell.

As shown in FIG. 6, the user equipment 600 may include a processing circuit 610. It should be noted that the user equipment 600 may include one processing circuit 610 or multiple processing circuits 610. In addition, the user equipment 600 may further include a communication unit 620, such as a transceiver.

As mentioned above, similarly, the processing circuit 610 may further include various discrete functional units to perform various different functions and/or operations. The functional units may be a physical entity or a logical entity, and units having different names may be implemented by a same physical entity.

First, the processing circuit 610 may cause the communication unit 620 to receive a used downlink reference signal from the neighbor cell.

Next, the processing circuit 610 may cause the communication unit 620 to notify a base station of the current cell of information on the received used downlink reference signal.

After that, the processing circuit 610 may cause the communication unit 620 to receive an available downlink reference signal with a highest quality from the base station of the current cell.

Preferably, the processing circuit 610 may cause the communication unit 620 to forward the received used downlink reference signal to the base station of the current cell.

On the other hand, the processing circuit 610 may process the received used downlink reference signal. As shown in FIG. 6, the processing circuit 610 may include an estimation unit 611.

In particular, first, the processing circuit 610 may cause the communication unit 620 to receive multiple candidate downlink reference signals from the base station of the current cell.

Next, the estimation unit 611 may perform a coherent operation on the received used downlink reference signal with each of the multiple candidate downlink reference signals, to estimate an intensity of an interference to which each of the multiple candidate downlink reference signals is subject from the neighbor cell.

After that, the processing circuit 610 may cause the communication unit 620 to transmit information on the intensity of the interference to which each of the multiple candidate downlink reference signals is subject from the neighbor cell to the base station of the current cell.

The electronic device in the wireless communication system according to the embodiment of the present disclosure is summarized above in connection with the accompanying drawings. The technical solution according to the present disclosure is described in further detail with reference to specific embodiments.

The reference signal is referred to as a pilot in the following description. In the technical solution according to the present disclosure, first, the pilot allocation information is exchanged. In particular, each base station may include a pilot stack to store information on an available pilot, for example, the information on the available pilot is stored in a memory. The pilot allocation information of each base station is shared among adjacent base stations. For example, in the LTE system, each eNB generates X2 signaling including pilot allocation information, and the pilot allocation information is carried by the X2 signaling to be exchanged among the eNBs. The X2 signaling includes an indication on an allocated pilot, for example one or more of a cell ID, a sequence number of the used pilot, a sequence number of the used pilot sequence group, and the group-hopping pattern.

Next, a quality of the pilot is estimated. In particular, each base station may estimate qualities of pilots in its own pilot stack based on an interaction mechanism for the pilot allocation information.

Finally, the pilot is allocated. For example, in the case where a new communication device (for example, the UE) accesses the system, a corresponding base station selects a pilot with a highest quality from its own pilot stack to allocate to the communication device.

Here, a quality of a pilot can be used to describe severity of an inter-cell interference that is caused by using the pilot in a current scenario.

Next, a method for estimating a quality of a pilot through multi-cell cooperation is described by way of examples. It is to be noted that the multi-cell cooperation in the present disclosure may only indicates exchanging information on a used pilot among multiple cells and cells are not necessary to coordinate to use the pilot, thus the pilot can be utilized efficiently with low system complexity.

For example, a base station of the i-th cell records information on a used pilot as follows:

$$S_i = \{k: \text{the pilot } \Phi_{k,i} \text{ is used in the } i\text{-th cell}\}, i = 1, 2, \ldots, L.$$

The base stations share information on the used pilot by interacting, where L represents the total number of cells, $\phi_{k,i}$ represents a pilot sequence with a sequence number k represented by a row vector in the i-th cell, and $\overline{S}_i$ represents a set of unused pilots.

Next, the base station of the i-th cell calculates the number of times that a pilot highly coherent with the pilot in the $\overline{S}_i$ is used in the neighbor cell as follows:

$$C_{i,k} = \sum_{j \neq i} |\{\phi_{k',j}: |\phi_{k',j} \phi_{k,i}^H| \geq \delta_i\}|, k \in \overline{S}_i, k' \in S_j.$$

The parameter $\delta_i$ is defined as a threshold for representing coherence of $\phi_{k,j}$ and $\phi_{k,j}$, and ranges according to $0 \leq \delta_i \leq |\phi_{k,j} \phi_{k,j}^H|^2$. An operation $|A|$ on the set A indicates calculating the number of elements in the set A, an operation $|x|$ on a complex number x means calculating an absolute value of the complex number x, and $x^H$ indicates conjugation transposition of the vector x.

After that, the i-th cell ranks the pilots based on the $C_{i,k}$ to form an available pilot stack of the i-th cell, and the pilot with a smaller $C_{i,k}$ is allocated preferentially.

Next, an observation-assisted method for estimating a quality of the pilot cooperatively is described by way of example.

First, based on exchanging of pilot information, the base station of the i-th cell has n candidate pilots with a higher quality to form a following candidate set (a pilot stack):

$$\Omega_i = \{k_{1,i}, k_{2,i}, \ldots, k_{n,i}\}.$$

Next, the base station of the i-th cell performs a coherent operation on the received uplink pilot sequence with the candidate pilots to estimate an intensity of an interference caused by using the pilot, which is indicated as follows:

$$ICI_{i,k} = \|Y_i^P \phi_{k,i}^H\|^2, k \in \Omega_i$$

$Y_i^P$ represents an uplink pilot signal received by the base station of the i-th cell, which may be, for example, an uplink pilot signal transmitted by a user in other cells or may be an uplink pilot signal transmitted by a user in the i-th cell to whom has been allocated an uplink pilot signal. The latter case is applicable to a case that each cell is divided into multiple regions (for example, the sectors as shown in FIG. 5).

After this, the base station may rank the candidate pilots based on a result of the estimation, and select, for example, an optimal pilot to allocate to a new user according to, for example, the criteria as follows:

$$\arg\min_{k} \{ICI_{i,k}: \forall k \in \Omega_i\}, i = 1, 2, \ldots, L.$$

According to an embodiment of the present disclosure, in the case where a new communication device accesses the system, the communication device sends a pilot allocation request to a corresponding base station. The base station selects a pilot with a highest quality from the pilot stack to allocate to the communication device after the communication device is confirmed.

According to another embodiment of the present disclosure, in the case where a service quality of a communication device degrades, the communication device requests a corresponding base station to allocate a pilot with a higher quality. The corresponding base station selects a pilot with a highest quality at present to allocate to the communication device after receiving the request. Alternatively, the base station estimates an uplink channel based on a pilot of the communication device and receives uplink data based on a result of the estimation. In the case where the base station determines that the quality of the received uplink data degrades, the base station may actively allocate a pilot with a higher quality for the communication device.

According to an embodiment of the present disclosure, in the case where a communication device exits from the system or is provided with a new pilot, a pilot discarded is recovered. The base station estimates a quality of the recovered pilot and then inserts the recovered pilot into the pilot stack.

According to an embodiment of the present disclosure, communication devices in the system have different priority levels, and the base station allocates/reserves a pilot with a higher quality to a communication device with a higher priority level, and allocates a pilot with a general or poor quality to a communication device with a low priority level.

According to an embodiment of the present disclosure, a quality of the pilot may be updated at a fixed interval. For example, a fixed time interval may be defined in the system, and all base stations may estimate the qualities of the pilots in the pilot stack at the fixed time interval.

On the other hand, the quality of the pilot may also be dynamically updated. For example, the base station updates the quality of the pilot in the pilot stack only when certain events occur, for example a new user accesses, a pilot is replaced, and a pilot is recovered. Otherwise, for the quality of the pilot, the information during a previous time period is used.

Practically, a hybrid mechanism may be employed, that is, the quality of the pilot is not only updated at a fixed interval but also updated dynamically.

Next, the technical solution according to the present disclosure is described in detail by taking the scenario of the simple multi-cell multi-user mobile cellular network as shown in FIG. 1 as an example.

In particular, basic parameters are set as follows: 1) the number of cells L=7; 2) the maximum number of users in each cell $K_{max}$=10 (that is, the total number of orthogonal pilots); 3) the instant number of users in each cell follows a distribution $K_i$: u[1, $K_{max}$]; 4) a radius of a cell R=500 m; 5) a signal to noise ratio of a user at an edge of the cell SNR=20 dB; 6) a propagation path loss index α=2; 7) a shadow fading coefficient of a logarithmic distribution $σ_{shadow}$=8 dB. A large-scale fading coefficient β of a user channel is generated based on the propagation path loss and an shadow fading effect, and a position of a user in each test is randomly generated.

Figure 8A:
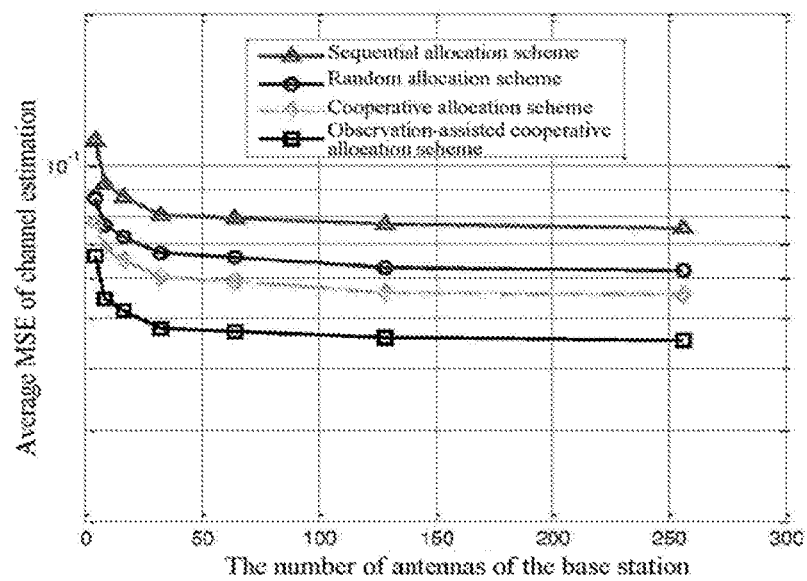
FIG. 8($a$) is a graph showing simulation results on channel estimations with different pilot allocation schemes in a simple scenario.

FIG. 8 (a) shows results of simulation with different pilot allocation schemes for the channel estimation. There are four pilot allocation schemes: 1) a sequential allocation scheme: allocating the pilots to the users accessed sequentially based on the subscript of the pilot sequence; 2) a random allocation scheme: randomly selecting a pilot from the available pilots to allocate to the users accessed; 3) a cooperative pilot allocation scheme: allocating the pilot cooperatively by counting the number of the pilots used by surrounding cells; 4) an observation-assisted cooperative pilot allocation scheme: estimating an intensity of inter-cell interference for the several pilots with higher qualities provided by the cooperative pilot allocation scheme, and selecting a pilot with a highest quality from the several pilots with higher qualities. Performance of the channel estimation is measured by the mean square error and is calculated according to a formula as follows:

$$MSE = E\left\{\frac{\|\hat{h}_{ijk} - h_{ijk}\|_2^2}{\|h_{ijk}\|_2^2}\right\}.$$

Figure 7:
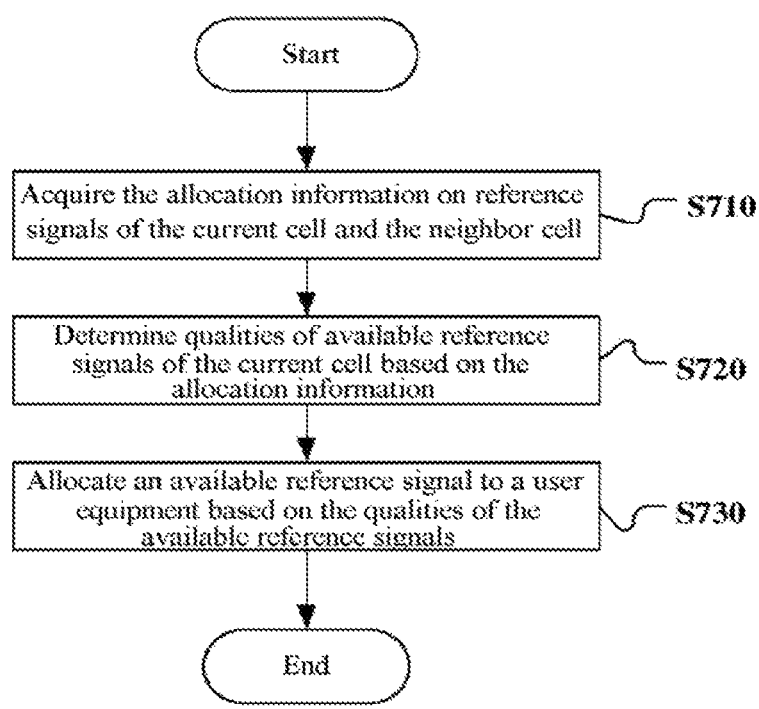
FIG. 7 is a flow chart showing a wireless communication method in a wireless communication system according to an embodiment of the present disclosure.
Figure 8B:
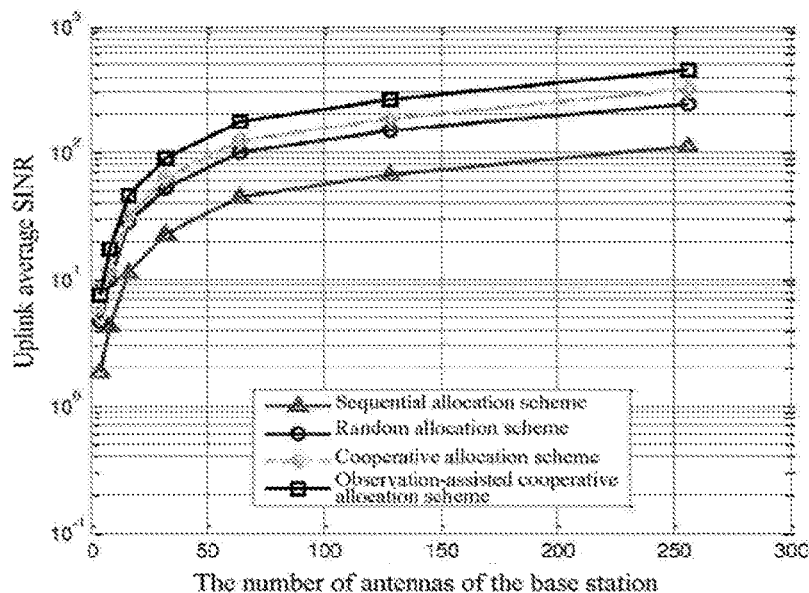

In which, $\hat{h}_{ijk}$ represents a result of the channel estimation. The average results of the simulation for all users in the system are shown in FIG. 7, and it can be seen that the performances can be improved with the increase of the number of antennas of a base station by adopting the four allocation schemes. It can be seen through comparing the performances obtained with the four allocation schemes that, the performance obtained with the sequential allocation scheme is the poorest, the performance obtained with the random allocation scheme is better than the performance obtained with the sequential allocation scheme, the performance obtained with the cooperative pilot allocation scheme according to the present disclosure is better than the performance obtained with the sequential allocation scheme and the performance obtained with the random allocation scheme, and a best performance is obtained with the observation-assisted cooperative pilot allocation scheme. FIG. 8(b) shows comparing of average signal to interference plus noise ratios (SINRs) of users for the four pilot allocation schemes. It is readily to see that the average signal to interference plus noise ratio of a user is greatly increased with the increase of the number of antennas of a base station. The random allocation scheme is superior to the sequential allocation scheme with which a poorest performance is achieved, and a high performance gain is achieved with the two pilot allocation schemes proposed in the present disclosure.

Next, an example of a simulation based on 3GPP TS 36.211 is given. In this example, a more complex and practical multi-cell multi-user mobile cellular network system is described. The parameters of the system are shown in the following table:

TABLE 1

| parameters of the simulation | |
|---|---|
| The total number of cells, L | L = 7 |
| The number of antennas in the base station, M | 8 ≤ M ≤ 256 |
| The maximum number of users in the cell, $K_{max}$ | $K_{max}$ = 8 |
| The radius of the cell, R | R = 500 m |
| The signal to noise ratio at an edge of the cell, SNR | 20 dB |
| The average energy emitted by the user | 0 dB |
| The average energy emitted by the base station | 10 dB |
| The path loss index α | α = 2 |
| The shadow fading of a logarithmic distribution, $σ_{shadow}$ | $σ_{shadow}$ = 8 dB |

A large-scale fading coefficient $β_{ijk}$ of a channel between a k-th user in a j-th cell and a base station in an i-th cell is calculated by the following equation:

$$β_{ijk} = \frac{z_{ijk}}{(r_{ijk}/R)^α}.$$

In which, $z_{ijk}$ represents a shadow fading effect coefficient, and follows a logarithmic distribution of a standard deviation $σ_{shadow}$=8 dB (10 $\log_{10}(z_{ijk})$ follows a gaussian distribution with a mean value of 0 and a standard deviation of $σ_{shadow}$), and $r_{ijk}$ represents a distance between the k-th user in the j-th cell and the base station of the i-th cell. In each simulation, the position of the user is randomly generated, and it may be assumed that the number of users in each cell follows a uniform distribution, i.e., $K_i$: u[1, $K_{max}$], and all users access to the system successively.

In the 3GPP, the base station estimates a channel status of a user by using an uplink SRS. Here, a length of an SRS sequence is N=24. For an i-th cell, a k-th SRS sequence $r_i^k$=[$r_i^k$(0), $r_i^k$(2), . . . , $r_i^k$(N−1)] is defined as follows by a basic sequence $\bar{r}_i$(n) and a rotation factor αk:

$$r_i^k(n)=e^{jαkn}\bar{r}_i(n), 0≤n<N.$$

In which, $$\alpha_k = 2\pi \frac{k-1}{8}, k = 1, 2, \ldots, K_{max}$$

may be set, and the basic sequence $\bar{r}_i(n)$ is given as follows:

$$\bar{r}_i(n) = e^{j\varphi_i(n)\pi/4}, 0 \leq n < N.$$

A value of $\varphi_i(n)$ can be found in a table 5.5.1.2-2 in TS 36.211. It will be appreciated by those skilled in the art that SRS sequences used in the same cell are orthogonal to each other and that different SRS sequence groups used in different cells are not orthogonal to each other, but are related to each other.

According to the cooperative pilot frequency allocation scheme provided by the present disclosure, the number of times that a specific pilot is reused by a neighbor cell is to be counted. Since SRS sequences used by the cells are related to each other but not completely the same with each other, the number of times that a specific pilot is reused cannot be counted. The cooperative pilot allocation scheme may be slightly modified to match specific attributes of the SRS sequence. Specifically, the base station performs a coherent operation on a specific SRS sequence with a used SRS sequence of a neighbor cell, and uses a value of the coherence as a quality index of the SRS sequence, so as to select an SRS sequence with the smallest coherence to allocate to a user of the cell. Mathematically, the base station of the i-th cell selects a pilot according to a principle as follows:

$$\arg\min_k \left\{ \sum_{j \neq i}^{L} \sum_{k' \in S_j} |r_j^{k'}(r_i^k)^H|, \forall k \in \bar{S}_i \right\}, i = 1, 2 \ldots, L.$$

Here, $S_i$ represents a set of used SRS sequences of the i-th cell, and $\bar{S}_i$ represents a set of unused SRS sequences of the i-th cell.

According to the observation-assisted cooperative pilot allocation scheme, the SRS sequence can function as a pilot sequence directly, as long as the previous principle is followed. The SRS sequence received by the base station of the i-th cell may be expressed as:

$$Y_i^{SRS} = \sum_{j=1}^{L} \sum_{k' \in S_j} h_{ijk} r_j^{k'} + N_i^{SRS}.$$

The base station of the i-th cell can obtain several sets $\Omega_i = \{k_{1,i}, k_{2,i}, \ldots, k_{n,i}\}$ of candidate SRS sequences with the cooperative pilot allocation scheme. It should be noted that the candidate SRS sequences herein may be different base sequences or sequences obtained by different shifts of a same base sequence. For a same base sequence, different sequences may be obtained by shifting. For a particular SRS sequence in the set, the base station may estimate an intensity of an inter-cell interference caused by the SRS sequence:

$$ICI_{i,k} = \|Y_i^{SRS}(r_i^k)^H\|^2, k \in \Omega_i.$$

Here, a property that the pilots used in the same cell are orthogonal to each other, that is, $(r_i^{k'})(r_i^k)^H = 0, \forall k \neq k'$, is employed. Based on the above, the base station of the i-th cell selects a pilot with a minimum inter-cell interference intensity from a set of the candidate SRS sequences according to the following principle:

$$\arg\min_k \{ICI_{i,k} : \forall k \in \Omega_i\}.$$

As described above, the cooperative pilot allocation scheme and the observation-assisted cooperative pilot allocation scheme according to the present disclosure can be applied to actual cases in the 3GPP after being modified slightly.

Figure 9A:
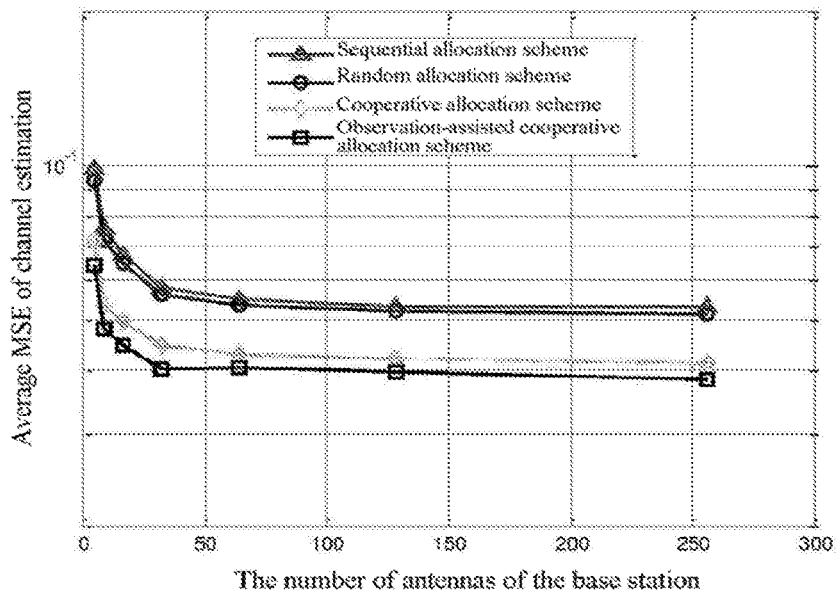
FIG. 9($a$) is a graph showing simulation results on channel estimations with different pilot allocation schemes in the case where a sounding reference signal (SRS) sequence is used in the 3rd generation partnership project (3GPP)
Figure 9B:
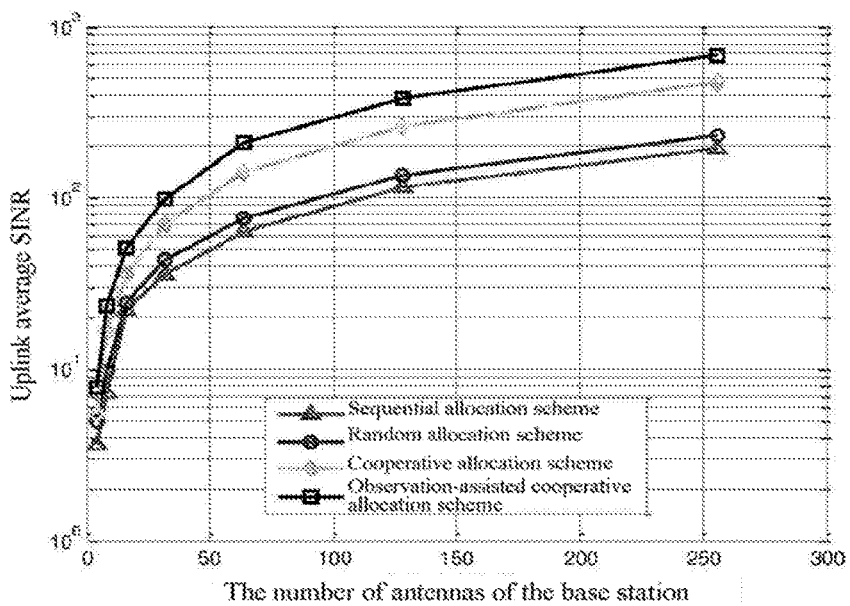

FIG. 9(a) shows results of simulation with different pilot allocation schemes for the channel estimation in the case that an SRS sequence is used in the 3GPP. There are four pilot allocation schemes: 1) a sequential allocation scheme; 2) a random allocation scheme; 3) a cooperative pilot allocation scheme; and 4) an observation-assisted cooperative pilot allocation scheme. The average results of the simulation are shown in FIG. 9(a), and it can be seen that performances can be improved with the increase of the number of antennas of a base station by adopting the four allocation schemes. A performance obtained with the sequential allocation scheme differs from a performance obtained with the random allocation scheme a little. Since the SRS sequences are not exactly the same for different cells, the performance of the sequential allocation scheme is improved as compared with a performance obtained in the case of complete reuse. The two schemes provided in the present disclosure are significantly superior to the sequential allocation scheme and the random allocation scheme. FIG. 9(b) shows comparing of uplink average signal to interference plus noise ratios (SINRs) of users for the four pilot allocation schemes. As can be seen from the figure, the uplink average signal to interference plus noise ratio of the user is greatly increased with the increase of the number of antennas of a base station. The random allocation scheme is superior to the sequential allocation scheme with which a poorest performance is achieved, and a high performance gain is achieved with the two pilot allocation schemes proposed in the present disclosure.

Next, a wireless communication method for a wireless communication system according to an embodiment of the present disclosure is described with reference to FIG. 7. Similarly, the wireless communication system includes multiple cells including a current cell and a neighbor cell.

As shown in FIG. 7, in step S710, allocation information on reference signals of the current cell and the neighbor cell is acquired.

Then, in step S720, qualities of available reference signals of the current cell are determined based on the allocation information.

Finally, in step S730, an available reference signal is allocated to a user equipment based on the qualities of the available reference signals.

Preferably, the method may further include: acquiring information on used reference signals of the neighbor cell; counting the number of used reference signals highly coherent with the available reference signals of the current cell; and determining the qualities of the available reference signals based on a result of the counting.

Preferably, the number of the used reference signals identical to the available reference signals of the current cell may be counted.

Preferably, the available reference signals may be ranked based on the qualities of the available reference signals.

Preferably, the method may further include: selecting multiple available reference signals with a high quality as candidate reference signals; performing a coherent operation on a received used reference signal with each of the candidate reference signals, to estimate an intensity of an interference to which each of the candidate reference signals is subject from the neighbor cell; and allocating a candidate reference signal with a minimum interference intensity, as an available reference signal with a highest quality, to the user equipment.

Preferably, the method may further include: acquiring, periodically and/or dynamically, updated allocation information on the reference signals of the current cell and the neighbor cell; and updating the qualities of the available reference signals of the current cell based on the updated allocation information.

Preferably, each of the multiple cells may include multiple cell partitions, and the method may further include: acquiring allocation information on reference signals of cell partitions of each of the current cell and the neighbor cell; and determining the qualities of available reference signals of a current cell partition in which the user equipment is located based on the allocation information.

Preferably, the method may further include: acquiring information on used reference signals of the cell partitions of the neighbor cell; counting the number of used reference signals highly coherent with the available reference signals of the current cell partition; and determining the qualities of the available reference signals based on a result of the counting.

Preferably, the number of the used reference signals identical to the available reference signals of the current cell partition may be counted.

Preferably, the method may further include: selecting multiple available reference signals with a high quality of the current cell partition as candidate reference signals; performing a coherent operation on a received used reference signal with each of the candidate reference signals, to estimate an intensity of an interference to which each of the candidate reference signals is subject from the neighbor cell or other cell partitions of the current cell; and allocating a candidate reference signal with a minimum interference intensity, as an available reference signal with a highest quality, to the user equipment.

Preferably, the method may further include: acquiring, periodically and/or dynamically, updated allocation information on the reference signals of the cell partitions of each of the current cell and the neighbor cell; and updating the qualities of the available reference signals of the current cell partition based on the updated allocation information.

Preferably, the reference signal may be an uplink reference signal, and the uplink reference signal may include a pilot signal including an SRS.

Preferably, the reference signal may be a downlink reference signal, and the downlink reference signal may include at least one of a CRS and a CSI-RS.

Preferably, the method may further include: selecting multiple available downlink reference signals with a high quality as candidate downlink reference signals; acquiring a report on a used downlink reference signal from the neighbor cell received by the user equipment; performing a coherent operation on the used downlink reference signal received by the user equipment with each of the candidate downlink reference signals, to estimate an intensity of an interference to which each of the candidate downlink reference signals is subject from the neighbor cell; and allocating a candidate downlink reference signal with a minimum interference intensity, as an available downlink reference signal with a highest quality, to the user equipment.

Preferably, the method may further include: selecting multiple available downlink reference signals with a high quality as candidate downlink reference signals to inform the user equipment; and allocating, in response to information from the user equipment on the intensity of the interference to which each of the candidate downlink reference signals is subject from the neighbor cell, a candidate downlink reference signal with a minimum interference intensity, as an available downlink reference signal with a highest quality, to the user equipment.

Preferably, the method may further include: determining a report threshold and selecting multiple available downlink reference signals with a high quality as candidate downlink reference signals to inform the user equipment; and allocating, in response to information from the user equipment on a candidate downlink reference signal with a desired interference intensity from the neighbor cell which is smaller than the report threshold among the candidate downlink reference signals and a desired interference level, a candidate downlink reference signal with a minimum interference intensity, as an available downlink reference signal with a highest quality, to the user equipment.

On the other hand, a wireless communication method for a wireless communication system according to another embodiment of the present disclosure may include: receiving a used downlink reference signal from a neighbor cell; informing a base station of a current cell of information on the received used downlink reference signal; and receiving, from the base station of the current cell, an available downlink reference signal with a highest quality.

Preferably, the received used downlink reference signal may be forwarded to the base station of the current cell.

Preferably, the method may further include: receiving multiple candidate downlink reference signals from the base station of the current cell; performing a coherent operation on the received used downlink reference signal with each of the multiple candidate downlink reference signals, to estimate an intensity of an interference to which each of the multiple candidate downlink reference signals is subject from the neighbor cell; and transmitting information on the intensity of the interference to which each of the multiple candidate downlink reference signals is subject from the neighbor cell to the base station of the current cell.

Various implementations of steps above in the wireless communication methods for the wireless communication system according to the embodiments of the present disclosure are described in detail, which are not repeated here.

The technology according to the present disclosure can be applied to various types of products. For example, the base station in the present disclosure may be implemented as any type of evolved node B (eNB), such as a macro eNB and a small eNB. The small eNB may be an eNB covering a cell smaller than a macro cell, such as a pico eNB, a micro eNB or a home (femto) eNB. Alternatively, the base station may be implemented as any other type of base station, such as a NodeB and a base transceiver station (BTS). The base station may include: a main body configured to control wireless communication (also referred to as a base station device); and one or more remote radio head ends (RRH) arranged at a location different from the main body. Various types of terminals described in the following may operate as a base station by performing functions of the base station temporarily or in a semi-persistent manner.

For example, the UE mentioned in the present disclosure may be implemented as a mobile terminal (such as a smartphone, a tablet personal computer (PC), a notebook PC, a portable game terminal, a portable/dongle mobile router and a digital camera device) or a vehicle terminal (such as an automobile navigation device). The UE may also be implemented as a terminal performing machine to machine (M2M) communication (also referred to as a machine-type communication (MTC) terminal). In addition, the UE may be a wireless communication module installed on each of the above terminals (such as an integrated circuit module including a single chip).

Figure 10:
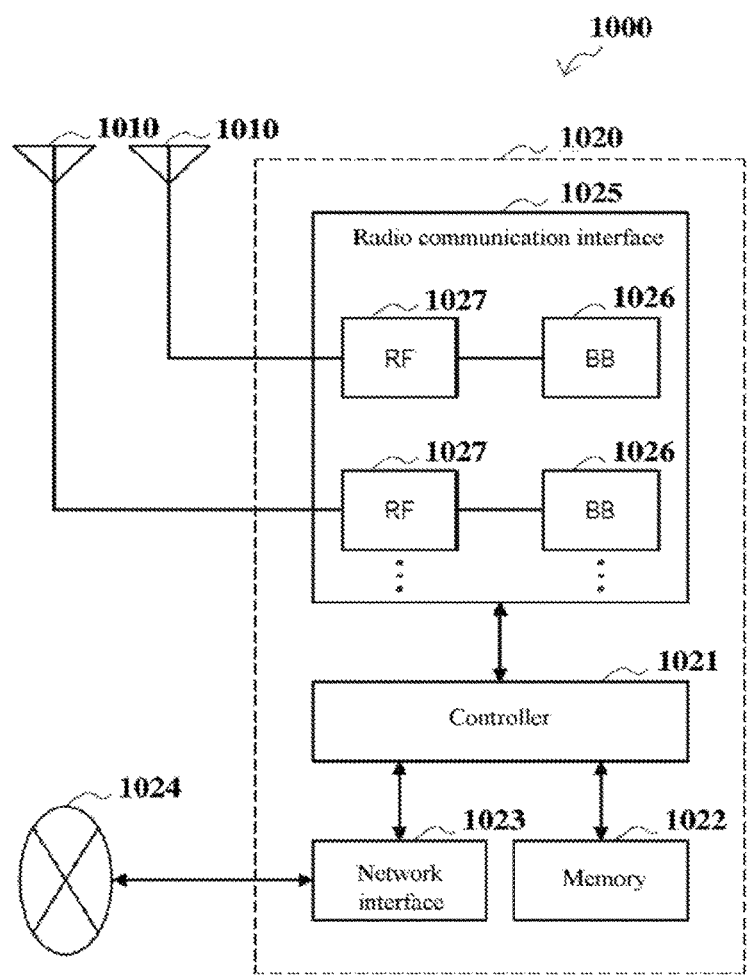
FIG. 10 is a block diagram of a first example of a schematic configuration of an Evolution Node Base Station (eNB) to which the present disclosure may be applied.

FIG. 10 is a block diagram of a first example of a schematic configuration of an eNB to which the technology of the present disclosure may be applied. An eNB 1000 includes one or more antennas 1010 and a base station device 1020. The base station device 1020 and each antenna 1010 may be connected to each other via an RF cable.

Each of the antennas 1010 includes one or more antenna elements (such as multiple antenna elements included in a multiple input multiple output (MIMO) antenna) and is used by the base station device 1020 to transmit and receive a radio signal. As shown in FIG. 10, the eNB 1000 may include multiple antennas 1010. For example, the multiple antennas 1010 may be compatible with multiple frequency bands used by the eNB 1000. Although FIG. 10 shows an example in which the eNB 1000 includes multiple antennas 1010, the eNB 1000 may include a single antenna 1010.

The base station device 1020 includes a controller 1021, a memory 1022, a network interface 1023 and a radio communication interface 1025.

The controller 1021 may be a CPU or a DSP and control various functions of higher layers of the base station device 1020. For example, the controller 1021 generates a data packet based on data in a signal processed by the radio communication interface 1025, and transfers the generated packet via a network interface 1023. The controller 1021 may bind data from multiple baseband processors to generate a binding packet and transfer the generated binding packet. The controller 1021 may have logic functions for performing the following control: radio resource control, radio carrying control, mobility management, admission control and schedule. The control may be performed in combination with an adjacent eNB or a core network node. The memory 1022 includes RAM and ROM, and stores programs executed by the controller 1021 and various types of control data (such as a terminal list, transmission power data and scheduling data).

The network interface 1023 is configured to connect the base station device 1020 to a communication interface of the core network 1024. The controller 1021 may communication with the core network node or another eNB via the network interface 1023. In this case, the eNB 1000 and the core network node or another eNB may be connected to each other via a logic interface (such as an S1 interface or an X2 interface). The network interface 1023 may be a wired communication interface or a radio communication interface for a wireless backhaul line. If the network interface 1023 is a radio communication interface, the network interface 1023 may use a higher frequency band for wireless communication as compared with the frequency band used by the radio communication interface 1025.

The radio communication interface 1025 supports any cellular communication scheme (such as long term evolution (LTE) and LTE-advanced), and provides a radio connection to a terminal located in a cell of the eNB 1000 via an antenna 1010. The radio communication interface 1025 may generally include a baseband (BB) processor 1026 and an RF circuit 1027. The BB processor 1026 may perform for example encoding/decoding, modulating/demodulating and multiplexing/demultiplexing, and various types of signal processing of layers (such as L1, medium access control (MAC), radio link control (RLC) and packet data convergence protocol (PDCP)). Instead of the controller 1021, the BB processor 1026 may have a part or all of the above logic functions. The BB processor 1026 may be a memory storing communication control programs or a module including a processor configured to execute programs and a related circuit. Updating programs may change functions of the BB processor 1026. The module may be a card or a blade inserted into a slot of the base station device 1020. Alternatively, the module may be a chip installed on the card or the blade. The RF circuit 1027 may include for example a mixer, a filter or an amplifier, and transmits and receives a radio signal via the antenna 1010.

As shown in FIG. 10, the radio communication interface 1025 may include multiple BB processors 1026. For example, the multiple BB processors 1026 may be compatible with multiple frequency bands used by the eNB 1000. As shown in FIG. 10, the radio communication interface 1025 may include multiple RF circuits 1027. For example, the multiple RF circuits 1027 may be compatible with multiple antenna elements. Although FIG. 10 shows an example in which the radio communication interface 1025 includes multiple BB processors 1026 and multiple RF circuits 1027, the radio communication interface 1025 may include a single BB processor 1026 or a single RF circuit 1027.

Figure 11:
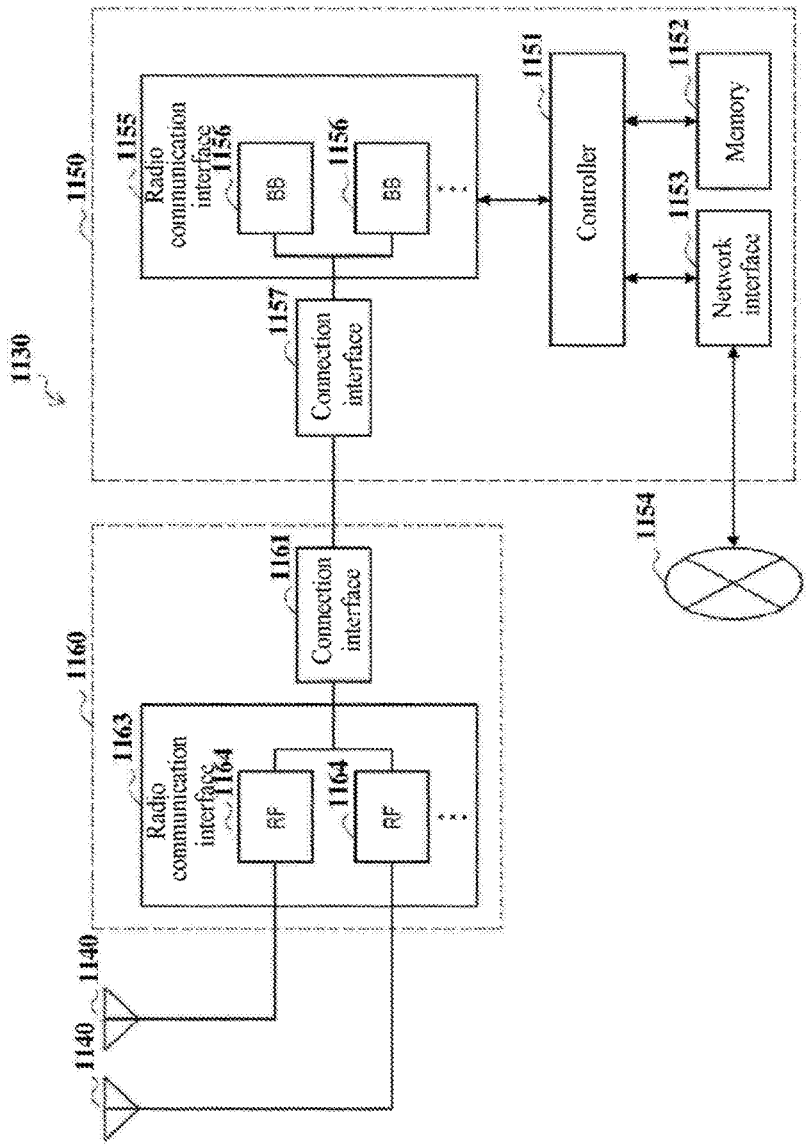
FIG. 11 is block diagram showing a second example of the schematic configuration of the eNB to which the present disclosure may be applied.

FIG. 11 is a block diagram showing a second example of a schematic configuration of the eNB to which the technology of the present disclosure may be applied. An eNB 1130 includes one or more antennas 1140, a base station device 1150 and an RRH 1160. The RRH 1160 and each antenna 1140 may be connected to each other via an RF cable. The base station device 1150 and the RRH 1160 may be connected to each other via a high speed line such as an optical fiber cable.

Each of the antennas 1140 includes one or more antenna elements (such as multiple antenna elements included in a MIMO antenna) and is used by the RRH 1160 to transmit and receive a radio signal. As shown in FIG. 11, the eNB 1130 may include multiple antennas 1140. For example, the multiple antennas 1140 may be compatible with multiple frequency bands used by the eNB 1130. Although FIG. 11 shows an example in which the eNB 1130 includes multiple antennas 1140, the eNB 1130 may include a single antenna 1140.

The base station device 1150 includes a controller 1151, a memory 1152, a network interface 1153, a radio communication interface 1155 and a connection interface 1157. The controller 1151, the memory 1152 and the network interface 1153 are the same as the controller 1021, the memory 1022 and the network interface 1023 described with reference to FIG. 10.

The radio communication interface 1155 supports any cellular communication solution (such as LTE and LTE-advanced), and provides wireless communication with a terminal located in a sector corresponding to the RRH 1160 via the RRH 1160 and the antenna 1140. The radio communication interface 1155 may generally include a BB processor 1156 for example. Other than connecting to an RF circuit 1164 of the RRH 1160 via the connection interface 1157, the BB processor 1156 is the same as the BB processor 1026 described with reference to FIG. 10. As shown in FIG. 11, the radio communication interface 1155 may include multiple BB processors 1156. For example, the multiple BB processors 1156 may be compatible with multiple frequency bands used by the eNB 1130. Although FIG. 11 shows an example in which the radio communication interface 1155 includes multiple BB processors 1156, the radio communication interface 1155 may include a single BB processor 1156.

The connection interface 1157 is an interface configured to connect the base station device 1150 (the radio communication interface 1155) to the RRH 1160. The connection interface 1157 may also be a communication module for communication in the high speed line connecting the base station device 1150 (the radio communication interface 1155) to the RRH 1160.

The RRH 1160 includes a connection interface 1161 and a radio communication interface 1163.

The connection interface 1161 is an interface configured to connect the RRH 1160 (the radio communication interface 1163) to the base station device 1150. The connection interface 1161 may also be a communication module for communication in the high speed line.

The radio communication interface 1163 transmits and receives a radio signal via the antenna 1140. The radio communication interface 1163 may generally include an RF circuit 1164, for example. The RF circuit 1164 may include for example a mixer, a filter and an amplifier, and transmits and receives a radio signal via the antenna 1140. As shown in FIG. 11, the radio communication interface 1163 may include multiple RF circuits 1164. For example, the multiple RF circuits 1164 may support multiple antenna elements. Although FIG. 11 shows an example in which the radio communication interface 1163 includes multiple RF circuits 1164, the radio communication interface 1163 may include a single RF circuit 1164.

In the eNB 1000 and the eNB 1130 shown by FIG. 10 and FIG. 11, the processing circuit 210, the acquisition unit 211, the determination unit 212 and the allocation unit 213 in the processing circuit 210 described with reference to FIG. 2 may be implemented by the controller 1021 and/or the controller 1151, and the communication unit 220 described with reference to FIG. 2 may be implemented by the radio communication interface 1025 and the radio communication interface 1155 and/or the radio communication interface 1163. At least a part of functions may be implemented by the controller 1021 and the controller 1151. For example, the controller 1021 and/or the controller 1151 may perform functions of PRS re-configuration information determination and DRS/PRS re-configuration by executing instructions stored in the corresponding memory.

Figure 12:
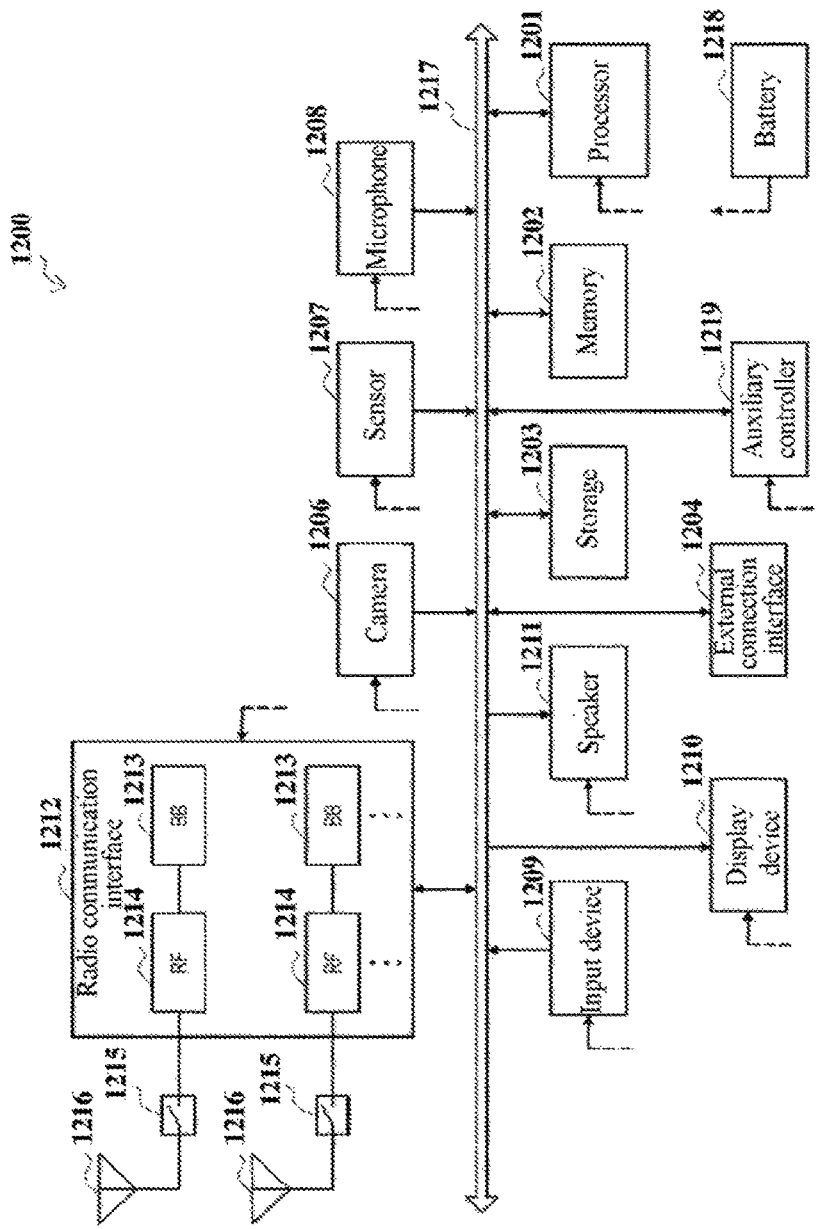
FIG. 12 is a block diagram showing an example of a schematic configuration of a smartphone to which the present disclosure may be applied.

FIG. 12 is a block diagram showing an example of a schematic configuration of a smartphone 1200 to which the technology of the present disclosure may be applied. The smartphone 1200 includes a processor 1201, a memory 1202, a storage 1203, an external connection interface 1204, a camera 1206, a sensor 1207, a microphone 1208, an input device 1209, a display device 1210, a speaker 1211, a radio communication interface 1212, one or more antenna switches 1215, one or more antennas 1216, a bus 1217, a battery 1218, and an auxiliary controller 1219.

The processor 1201 may be, for example, a CPU or a system on a chip (SoC), and controls functions of an application layer and another layer of the smartphone 1200. The memory 1202 includes RAM and ROM, and stores a program that is executed by the processor 1201, and data. The storage 1203 may include a storage medium such as a semiconductor memory and a hard disk. The external connection interface 1204 is an interface for connecting an external device such as a memory card and a universal serial bus (USB) device to the smartphone 1200.

The camera 1206 includes an image sensor such as a charge coupled device (CCD) and a complementary metal oxide semiconductor (CMOS), and generates a captured image. The sensor 1207 may include a group of sensors such as a measurement sensor, a gyro sensor, a geomagnetic sensor, and an acceleration sensor. The microphone 1208 converts sounds that are input to the smartphone 1200 into audio signals. The input device 1209 includes, for example, a touch sensor configured to detect touch onto a screen of the display device 1210, a keypad, a keyboard, a button, or a switch, and receive an operation or information input from a user. The display device 1210 includes a screen such as a liquid crystal display (LCD) and an organic light-emitting diode (OLED) display, and displays an output image of the smartphone 1200. The speaker 1211 converts audio signals that are output from the smartphone 1200 into sounds.

The radio communication interface 1212 supports any cellular communication scheme such as LTE and LTE-Advanced, and performs radio communication. The radio communication interface 1212 may generally include, for example, a BB processor 1213 and an RF circuit 1214. The BB processor 1213 may perform, for example, encoding/decoding, modulating/demodulating, and multiplexing/demultiplexing, and performs various types of signal processing for radio communication. Meanwhile, the RF circuit 1214 may include, for example, a mixer, a filter, and an amplifier, and transmits and receives radio signals via the antenna 1216. The radio communication interface 1212 may be a chip module having the BB processor 1213 and the RF circuit 1214 integrated thereon. The radio communication interface 1212 may include multiple BB processors 1213 and multiple RF circuits 1214, as illustrated in FIG. 12. Although FIG. 12 illustrates the example in which the radio communication interface 1212 includes the multiple BB processors 1213 and the multiple RF circuits 1214, the radio communication interface 1212 may also include a single BB processor 1213 or a single RF circuit 1214.

Furthermore, in addition to a cellular communication scheme, the radio communication interface 1212 may support another type of radio communication scheme such as a short-distance radio communication scheme, a near field communication scheme, and a radio local area network (LAN) scheme. In this case, the radio communication interface 1212 may include the BB processor 1213 and the RF circuit 1214 for each radio communication scheme.

Each of the antenna switches 1215 switches connection destinations of the antennas 1216 among multiple circuits (such as circuits for different radio communication schemes) included in the radio communication interface 1212.

Each of the antennas 1216 includes a single or multiple antenna elements (such as multiple antenna elements included in a MIMO antenna), and is used for the radio communication interface 1212 to transmit and receive radio signals. The smartphone 1200 may include the multiple antennas 1216, as illustrated in FIG. 12. Although FIG. 12 illustrates the example in which the smartphone 1200 includes the multiple antennas 1216, the smartphone 1200 may also include a single antenna 1216.

Furthermore, the smartphone 1200 may include the antenna 1216 for each radio communication scheme. In this case, the antenna switches 1215 may be omitted from the configuration of the smartphone 1200.

The bus 1217 connects the processor 1201, the memory 1202, the storage 1203, the external connection interface 1204, the camera 1206, the sensor 1207, the microphone 1208, the input device 1209, the display device 1210, the speaker 1211, the radio communication interface 1212, and the auxiliary controller 1219 to each other. The battery 1218 supplies power to blocks of the smartphone 1200 illustrated in FIG. 12 via feeder lines, which are partially shown as dashed lines in the figure. The auxiliary controller 1219 operates a minimum necessary function of the smartphone 1200, for example, in a sleep mode.

In the smartphone 1200 shown in FIG. 12, the processing circuit 610 and the estimation unit 611 in the processing circuit 610 described with reference to FIG. 6 may be implemented by the processor 1201 or the auxiliary controller 1219, and the communication unit 620 described with reference to FIG. 6 may be implemented by the radio communication interface 1212. At least a part of functions may be implemented by a processor 1201 or an auxiliary controller 1219. For example, the processor 1201 or the auxiliary controller 1219 can perform functions of location measurement auxiliary data determination, location measurement and location information generation by executing the instructions stored in the memory 1202 or the storage device 1203.

Figure 13:
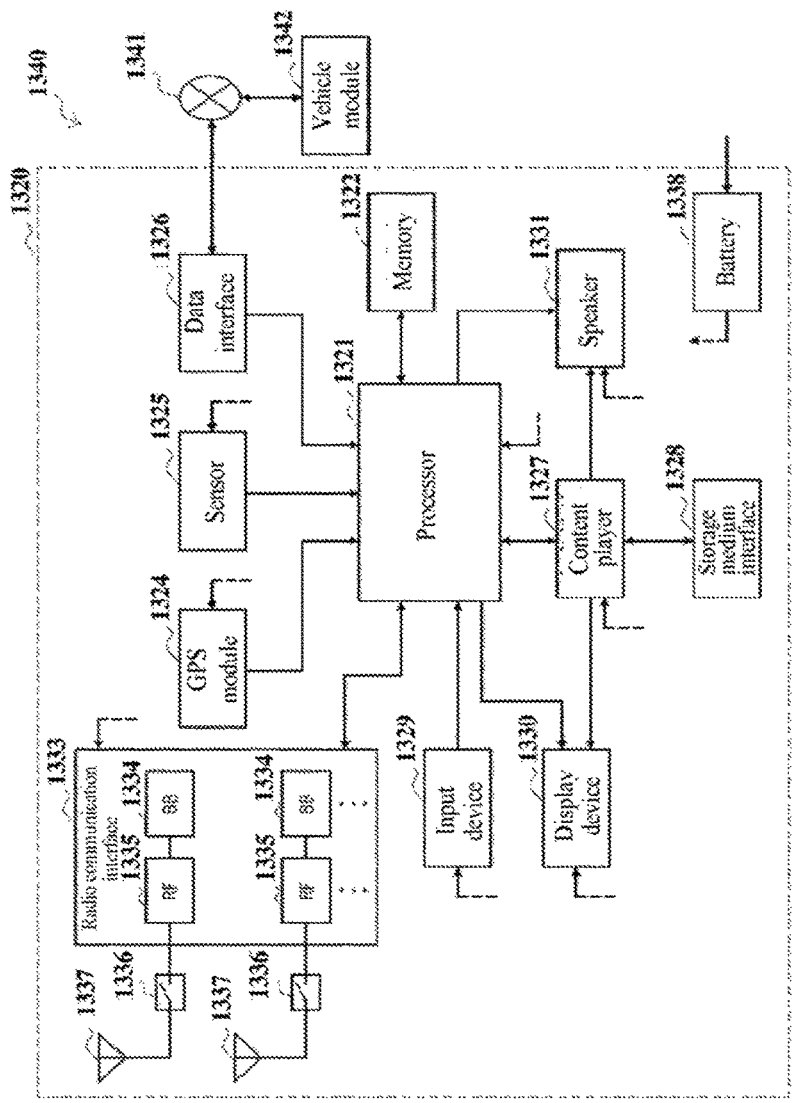
FIG. 13 is a block diagram showing an example of a schematic configuration of an automobile navigation device to which the present disclosure may be applied.

FIG. 13 is a block diagram showing an example of a schematic configuration of an automobile navigation device 1320 to which the technology of the present disclosure may be applied. The automobile navigation device 1320 includes: a processor 1321, a memory 1322, a global positioning system (GPS) module 1324, a sensor 1325, a data interface 1326, a content player 1327, a storage medium interface 1328, an input device 1329, a display device 1330, a speaker 1331, a radio communication interface 1333, one or more antenna switches 1336, one or more antennas 1337 and a battery 1338.

The processor 1321 may be a CPU or SoC for example, and control a navigation function and other functions of the automobile navigation device 1320. The memory 1322 includes RAM and ROM, and stores a program executed by the processor 1321, and data.

The GPS module 1324 measures a location of the automobile navigation device 1320 (such as a latitude, a longitude and a height) using a GPS signal received from a GPS satellite. The sensor 1325 may include a group of sensors such as a gyro sensor, a geomagnetic sensor, and an air pressure sensor. The data interface 1326 is connected to for example a vehicle network 1341 via a terminal not shown, and acquires data generated by a vehicle (such as vehicle speed data).

The content player 1327 reproduces content stored in a storage medium (such as CD and DVD), and the storage medium is inserted into the storage medium interface 1328. The input device 1329 includes a touch sensor configured to detect touch on a screen of the display device 1330, a button or a switch for example, and receives an operation or information inputted by a user. The display device 1330 includes a screen of an LCD or an OLED display, and displays an image for a navigation function or the reproduced content. The speaker 1331 outputs a sound for a navigation function or the reproduced content.

The radio communication interface 1333 supports any cellular communication scheme (such as LTE and LTE-advanced) and performs wireless communication. The radio communication interface 1333 may generally include a BB processor 1334 and an RF circuit 1335. The BB processor 1334 may perform encoding/decoding, modulating/demodulating and multiplexing/demultiplexing for example, and perform various types of signal processing for wireless communication. The RF circuit 1335 may include a mixer, a filter and an amplifier for example, and transmits and receives a radio signal via the antenna 1337. The radio communication interface 1333 may be a chip module on which the BB processor 1334 and the RF circuit 1335 are integrated. As shown in FIG. 13, the radio communication interface 1333 may include multiple BB processors 1334 and multiple RF circuits 1335. Although FIG. 13 shows an example in which the radio communication interface 1333 includes multiple BB processors 1334 and multiple RF circuits 1335, the radio communication interface 1333 may include a single BB processor 1334 or a single RF circuit 1335.

In addition to the cellular communication scheme, the radio communication interface 1333 may support another type of wireless communication scheme, such as a short-distance wireless communication scheme, a near field communication scheme and a wireless LAN scheme. In this case, for each of the wireless communication schemes, the radio communication interface 1333 may include a BB processor 1334 and an RF circuit 1335.

Each of the antenna switches 1336 switches a connection destination of the antenna 1337 among multiple circuits included in the radio communication interface 1333 (such as circuits for different wireless communication schemes).

Each of the antennas 1337 includes one or more antenna elements (such as multiple antenna elements included in a MIMO antenna) and is used by the radio communication interface 1333 to transmit and receive a radio signal. As shown in FIG. 13, the automobile navigation device 1320 may include multiple antennas 1337. Although FIG. 13 shows an example in which the automobile navigation device 1320 includes multiple antennas 1337, the automobile navigation device 1320 may include a single antenna 1337.

The automobile navigation device 1320 may include an antenna 1337 for each wireless communication scheme. In this case, the antenna switch 1336 may be omitted from a configuration of the automobile navigation device 1320.

The battery 1338 supplies power for various blocks of the automobile navigation device 1320 shown in FIG. 13 via a feeder line which is indicated partially as a dotted line. The battery 1338 accumulates power provided by the vehicle.

In the automobile navigation device 1320 shown in FIG. 13, the processing circuit 610 and the estimation unit 611 in the processing circuit 610 described with reference to FIG. 6 may be implemented by the processor 1321, and the communication unit 620 described with reference to FIG. 6 may be implemented by the radio communication interface 1333. At least a part of functions may be implemented by the processor 1321. For example, the processor 1321 can perform functions of location measurement auxiliary data determination, location measurement and location information generation by executing the instructions stored in the memory 1322.

The technology of the present disclosure may be implemented as a vehicle system (or a vehicle) 1340 including one or more of the automobile navigation device 1320, a vehicle network 1341 and a vehicle module 1342. The vehicle module 1342 generates vehicle data (such as information on a vehicle speed, a motor speed and a fault), and outputs the generated data to the vehicle network 1341.

In the device and the method of the present disclosure, it is apparent that each unit or step can be decomposed and/or recombined. These decomposition and/or recombination shall be considered as equivalents of the present disclosure. Also, steps for executing the above-described series of processing can be naturally performed in chronological order in the order described, but are not necessarily performed in chronological order. Some steps may be performed in parallel or independently from each other.

As is appreciated by those skilled in the art, various aspects of the present disclosure may be embodied as a system, method or device program product. Accordingly, aspects of the present disclosure may take the form of an entirely hardware embodiment or an embodiment including software that may all generally be referred to herein as a "circuit," "unit" or "system." Furthermore, aspects of the present disclosure may take the form of a device program product embodied in device readable medium(s) having device readable program code embodied therewith.

It should be noted that the various functions described herein may be implemented using instructions stored on a device readable storage medium, such as a non-signal storage device, that are executed by a processor. A storage device may be, for example, an electronic, magnetic, optical, electromagnetic, infrared, or semiconductor system, device, or apparatus, or any suitable combination thereof. More specific examples of a storage medium include: a portable computer magnetic disk, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of the present disclosure, a storage device is not a signal and "non-transitory" includes all mediums except a signal medium.

Program codes included on a storage medium may be transmitted using any appropriate medium, including but not limited to wireless, wired, optical cable, RF, etc., or any suitable combination thereof.

Program codes for carrying out operations may be written in any combination of one or more programming languages, or may be machine codes. The program codes may be executed entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the devices may be connected via other devices (for example, over the Internet provided by an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functions may be implemented at least in part by program instructions. These program instructions may be provided to a processor of a general-purpose information processing device, a dedicated information processing device or other programmable data processing device to produce a machine, such that the instructions executed via the processor of the device implement the specified functions/actions.

It should be noted that, while specific blocks are used in the figures and blocks are illustrated in a particular order, the examples are not intended to limit. In some cases, two or more modules may be combined, a block may be divided into two or more blocks, or certain blocks may be re-ordered or re-organized as appropriate, as the explicitly illustrated examples are used only for description and should not be construed as limiting.

Although the embodiments of the present disclosure have been described in detail in combination with the drawings above, it should be understood that, the embodiments described above are only used to explain the present disclosure and are not constructed as the limitation to the present disclosure. For those skilled in the art, various modifications and alternations can be made to the above embodiments without departing from the essential and scope of the present disclosure. Therefore, the scope of the present disclosure is only defined by the appended claims and the equivalents thereof.

The invention claimed is:

1. An electronic device in a wireless communication system, wherein the wireless communication system comprises a plurality of cells comprising a current cell in which the electronic device is located and a neighbor cell, and the electronic device comprises:
    one or more processing circuits configured to perform operations of:
        acquiring allocation information on reference signals of the current cell and the neighbor cell;
        determining, based on the allocation information, qualities of available reference signals of the current cell; and
    allocating-by the current cell, based on the relative qualities of the available reference signals, an available reference signal to a user equipment to reduce inter-cell interference and improve performance of the wireless communication system, wherein the processing circuit is further configured to perform operations of:
    acquiring, periodically and/or dynamically, updated allocation information on the reference signals of the current cell and the neighbor cell; and
    updating, based on the updated allocation information, the qualities of the available reference signals of the current cell.

2. The electronic device according to claim 1, wherein the processing circuit is further configured to perform operations of:
    acquiring information on used reference signals of the neighbor cell;
    counting the number of used reference signals highly coherent with the available reference signals of the current cell; and
    determining, based on a result of the counting, the qualities of the available reference signals.

3. The electronic device according to claim 2, wherein the processing circuit is configured to count the number of used reference signals identical to the available reference signals of the current cell.

4. The electronic device according to claim 1, wherein the processing circuit is further configured to rank the available reference signals based on the qualities of the available reference signals.

5. The electronic device according to claim 4, wherein the processing circuit is further configured to perform operations of:
    selecting a plurality of available reference signals with a high quality as candidate reference signals;
    performing a coherent operation on a received used reference signal with each of the candidate reference signals, to estimate an intensity of an interference to which each of the candidate reference signals is subject from the neighbor cell; and
    allocating a candidate reference signal with a minimum interference intensity, as an available reference signal with a highest quality, to the user equipment.

6. The electronic device according to claim 1, wherein each of the plurality of cells comprises a plurality of cell partitions, and the processing circuit is further configured to perform operations of:
  acquiring allocation information on reference signals of cell partitions of each of the current cell and the neighbor cell; and
  determining, based on the allocation information, the qualities of available reference signals of a current cell partition in which the user equipment is located.

7. The electronic device according to claim 6, wherein the processing circuit is further configured to perform operations of:
  acquiring information on used reference signals of the cell partitions of the neighbor cell;
  counting the number of used reference signals highly coherent with the available reference signals of the current cell partition; and
  determining the qualities of the available reference signals based on a result of the counting.

8. The electronic device according to claim 6, wherein the processing circuit is further configured to perform operations of:
  selecting a plurality of available reference signals with a high quality of the current cell partition as candidate reference signals;
  performing a coherent operation on a received used reference signal with each of the candidate reference signals, to estimate an intensity of an interference to which each of the candidate reference signals is subject from the neighbor cell or other cell partitions of the current cell; and
  allocating a candidate reference signal with a minimum interference intensity, as an available reference signal with a highest quality, to the user equipment.

9. The electronic device according to claim 1, wherein the reference signal is an uplink reference signal, and the uplink reference signal comprises a pilot signal comprising a sounding reference signal SRS.

10. The electronic device according to claim 1, wherein the reference signal is a downlink reference signal, and the downlink reference signal comprises at least one of a cell-specific reference signal CRS and a channel state information reference signal CSI-RS.

11. The electronic device according to claim 10, wherein the processing circuit is further configured to perform operations of:
  selecting a plurality of available downlink reference signals with a high quality as candidate downlink reference signals;
  acquiring a report on a used downlink reference signal from the neighbor cell received by the user equipment;
  performing a coherent operation on the used downlink reference signal received by the user equipment with each of the candidate downlink reference signals, to estimate an intensity of an interference to which each of the candidate downlink reference signals is subject from the neighbor cell; and
  allocating a candidate downlink reference signal with a minimum interference intensity, as an available downlink reference signal with a highest quality, to the user equipment.

12. The electronic device according to claim 10, wherein the processing circuit is further configured to perform operations of:
  selecting a plurality of available downlink reference signals with a high quality as candidate downlink reference signals to inform the user equipment; and
  allocating, in response to information from the user equipment on the intensity of the interference to which each of the candidate downlink reference signals is subject from the neighbor cell, a candidate downlink reference signal with a minimum interference intensity, as an available downlink reference signal with a highest quality, to the user equipment.

13. The electronic device according to claim 10, wherein the processing circuit is further configured to perform operations of:
  determining a report threshold and selecting a plurality of available downlink reference signals with a high quality as candidate downlink reference signals to inform the user equipment; and
  allocating, in response to information from the user equipment on a candidate downlink reference signal with a desired interference intensity from the neighbor cell which is smaller than the report threshold among the candidate downlink reference signals and on a desired interference level, a candidate downlink reference signal with a minimum interference intensity, as an available downlink reference signal with a highest quality, to the user equipment.

14. The electronic device according to claim 1, wherein the electronic device is a base station, and further comprises a transceiver configured to acquire the allocation information on the reference signals of the neighbor cell via X2 signaling.

15. A user equipment in a wireless communication system, wherein the wireless communication system comprises a plurality of cells comprising a current cell in which the user equipment is located and a neighbor cell, and the user equipment comprises:
  a transceiver; and
  one or more processing circuits configured to cause the transceiver to perform operations of:
    receiving a used downlink reference signal from the neighbor cell;
    informing a base station of the current cell of information on the received used downlink reference signal; and
  receiving, from the base station of the current cell, an available downlink reference signal with a highest relative quality so as to reduce inter-cell interference and improve performance of the wireless communication system, wherein the processing circuit is further configured to perform operations of:
  causing the transceiver to receive a plurality of candidate downlink reference signals from the base station of the current cell;
  performing a coherent operation on the received used downlink reference signal with each of the plurality of candidate downlink reference signals, to estimate an intensity of an interference to which each of the plurality of candidate downlink reference signals is subject from the neighbor cell; and
  causing the transceiver to transmit, information on the intensity of the interference to which each of the plurality of candidate downlink reference signals is subject from the neighbor cell, to the base station of the current cell.

16. The user equipment according to claim 15, wherein the processing circuit is configured to cause the transceiver to forward the received used downlink reference signal to the base station of the current cell.

17. A wireless communication method in a wireless communication system, wherein the wireless communication system comprises a plurality of cells comprising a current cell and a neighbor cell, and the method comprises:
   acquiring allocation information on reference signals of the current cell and the neighbor cell;
   determining qualities of available reference signals of the current cell based on the allocation information; and
   allocating by the current cell an available reference signal to a user equipment based on relative qualities of the available reference signals so as to reduce inter-cell interference and improve performance of the wireless communication system, wherein
   the acquiring includes acquiring, periodically and/or dynamically, updated allocation information on the reference signals of the current cell and the neighbor cell, and
   updating, based on the updated allocation information, the qualities of the available reference signals of the current cell.

18. A wireless communication method in a wireless communication system, wherein the wireless communication system comprises a plurality of cells comprising a current cell and a neighbor cell, and the method comprises:
   receiving a used downlink reference signal from the neighbor cell;
   informing a base station of the current cell of information on the received used downlink reference signal;
   receiving, from the base station of the current cell, an available downlink reference signal with a highest relative quality so as to reduce inter-cell interference and improve performance of the wireless communication system;
   causing a transceiver to receive a plurality of candidate downlink reference signals from the base station of the current cell;
   performing a coherent operation on the received used downlink reference signal with each of the plurality of candidate downlink reference signals, to estimate an intensity of an interference to which each of the plurality of candidate downlink reference signals is subject from the neighbor cell; and
   causing the transceiver to transmit, information on the intensity of the interference to which each of the plurality of candidate downlink reference signals is subject from the neighbor cell, to the base station of the current cell.

* * * * *